(12) United States Patent
Ebert et al.

(10) Patent No.: US 9,128,589 B1
(45) Date of Patent: *Sep. 8, 2015

(54) METHOD AND APPARATUS FOR NOTIFICATION ON AN ELECTRONIC HANDHELD DEVICE USING AN ATTENTION MANAGER

(75) Inventors: Bob Ebert, Montpellier (FR); Peter Epstein, Palo Alto, CA (US); Georgiann Puckett, Cupertino, CA (US)

(73) Assignee: Google Inc., Mountain View, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 13/619,912

(22) Filed: Sep. 14, 2012

Related U.S. Application Data

(63) Continuation of application No. 13/460,489, filed on Apr. 30, 2012, which is a continuation of application No. 12/114,831, filed on May 5, 2008, now Pat. No. 8,181,124, which is a continuation of application No. 09/801,983, filed on Mar. 7, 2001, now Pat. No. 7,370,289.

(51) Int. Cl.
| | |
|---|---|
| *G06F 3/0482* | (2013.01) |
| *G06F 11/32* | (2006.01) |
| *H04L 12/58* | (2006.01) |
| *H04M 15/00* | (2006.01) |
| *H04M 1/725* | (2006.01) |

(52) U.S. Cl.
CPC ............ *G06F 3/0482* (2013.01); *G06F 11/324* (2013.01); *H04L 51/24* (2013.01); *H04M 1/72547* (2013.01); *H04M 15/83* (2013.01)

(58) Field of Classification Search
CPC ..... G06F 11/324; G06F 3/0482; H04L 51/24; H04M 1/72547; H04M 15/83
USPC .......... 715/704, 772, 779, 809, 864; 709/319, 709/328
See application file for complete search history.

(56) References Cited

U.S. PATENT DOCUMENTS

| | | | |
|---|---|---|---|
| 5,165,012 | A | 11/1992 | Crandall et al. |
| 5,381,470 | A | 1/1995 | Cambray et al. |

(Continued)

OTHER PUBLICATIONS

Office Action from U.S. Appl. No. 13/460,489, dated Jul. 18, 2014, 13 pp.
Prosecution history from U.S. Appl. No. 09/801,983, dated Oct. 7, 2003 through Dec. 31, 2007, 222 pp.
Prosecution history from U.S. Appl. No. 09/801,983, dated Oct. 20, 2011 through Jan. 18, 2012, 21 pp.

(Continued)

*Primary Examiner* — Ting Lee
(74) *Attorney, Agent, or Firm* — Shumaker & Sieffert, P.A.

(57) ABSTRACT

A method and system for notification in a palm-sized computer system. Specifically, the present invention discloses an Attention Manager that manages application demand for a user's attention. The Attention Manager receives multiple attention requests from varying applications. With each new attention request received that indicates a record needs a user's attention, the Attention Manager stores the request in memory and determines if are other outstanding attention requests that have not been cleared. Depending on number of outstanding requests, the Attention Manager sends a request for record information in list or detail format. If there are multiple outstanding attention requests, the Attention Manager displays a notification dialog in a list format. If there is only one outstanding attention request, the Attention Manager displays the notification dialog in detail format. Additionally, a simple user interface to navigate to the application and record entry requiring attention is provided.

15 Claims, 11 Drawing Sheets

(56) References Cited

U.S. PATENT DOCUMENTS

| | | | |
|---|---|---|---|
| 6,209,011 | B1 | 3/2001 | Vong et al. |
| 6,553,416 | B1 | 4/2003 | Chari et al. |
| 7,370,289 | B1 | 5/2008 | Ebert et al. |
| 8,181,124 | B2 | 5/2012 | Ebert et al. |
| 8,701,027 | B2 | 4/2014 | van Dantzich et al. |
| 2008/0209452 | A1 | 8/2008 | Ebert et al. |

OTHER PUBLICATIONS

U.S. Appl. No. 13/460,489, by Bob Ebert, filed Apr. 30, 2012.

Response to Office Action from U.S. Appl. No. 13/460,489, dated Jul. 18, 2014, filed Oct. 17, 2014, 13 pp.

Office Action dated Mar. 26, 2015, from U.S. Appl. No. 13/460,489, 15 pp.

Response to Office Action dated Mar. 26, 2015, from U.S. Appl. No. 13/460,489, filed Jun. 26, 2015, 12 pp.

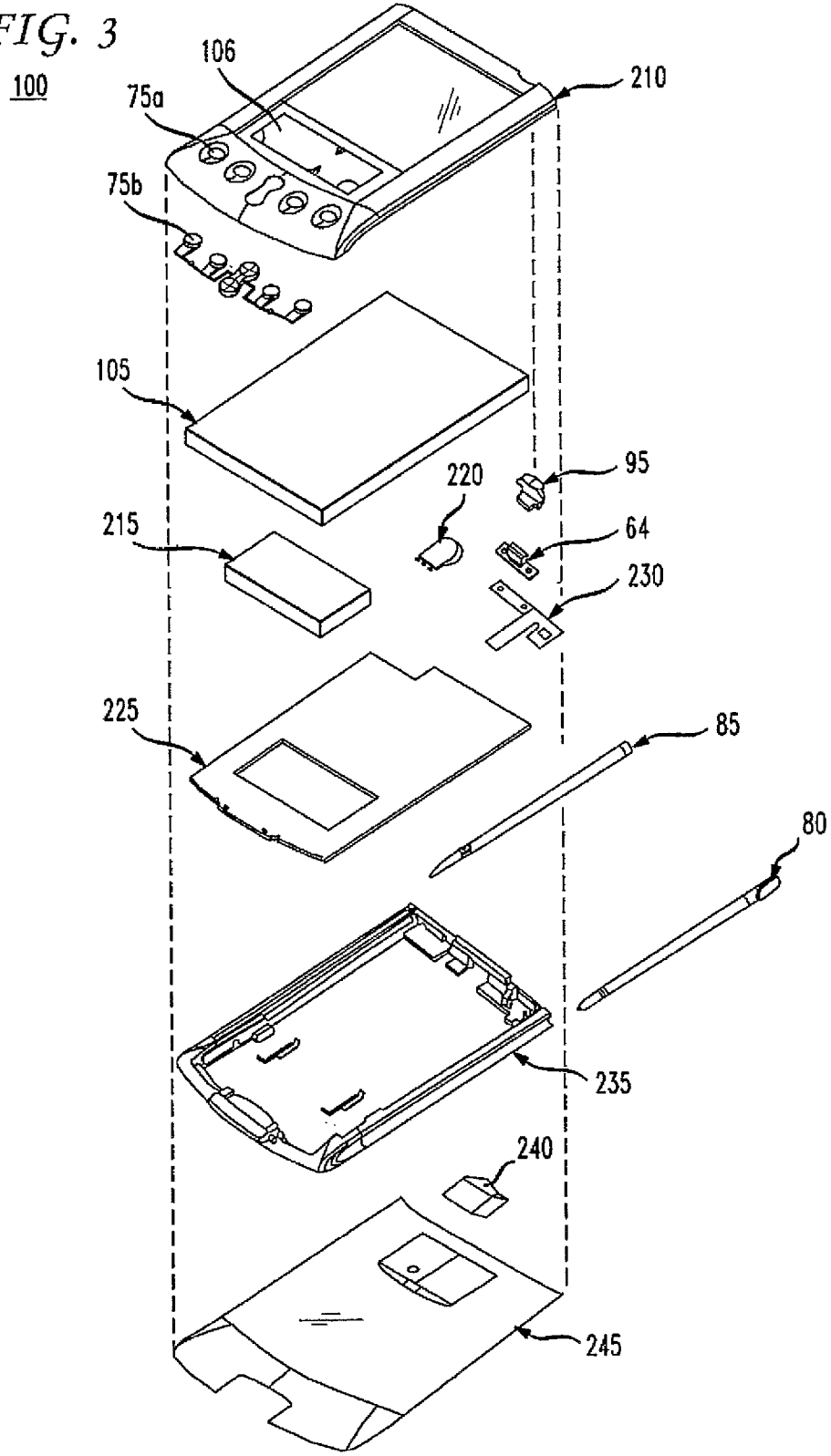

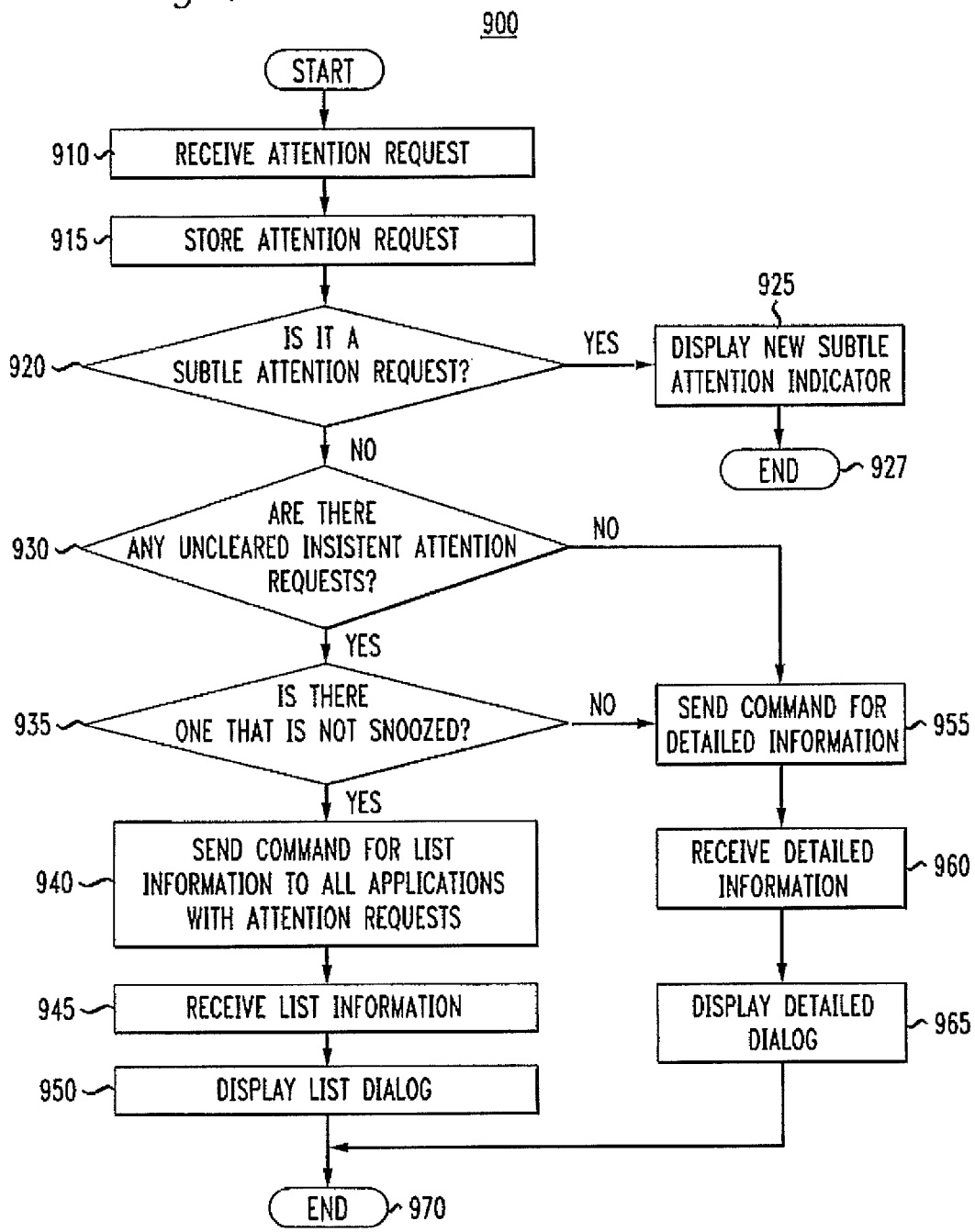

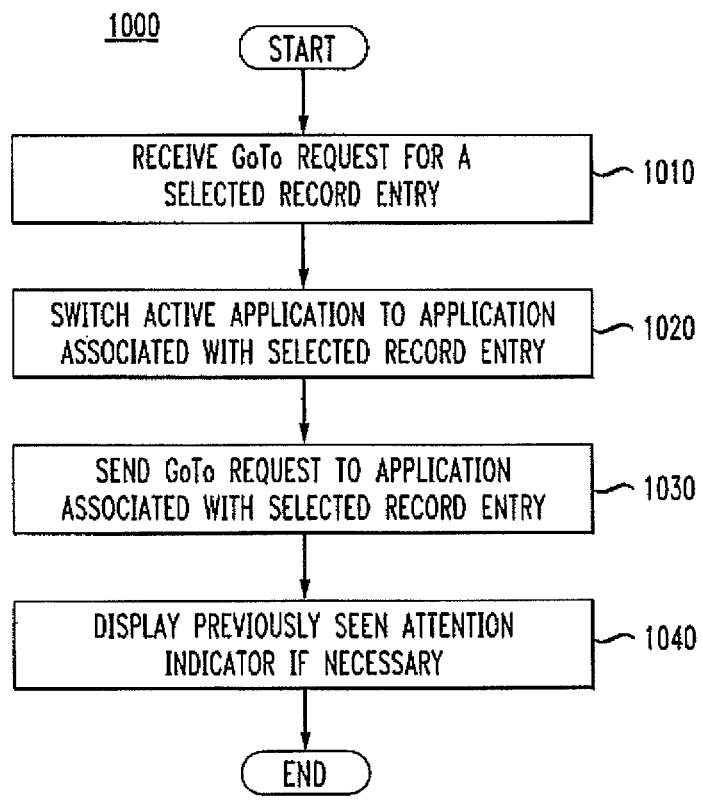

METHOD AND APPARATUS FOR NOTIFICATION ON AN ELECTRONIC HANDHELD DEVICE USING AN ATTENTION MANAGER

CROSS REFERENCE TO RELATED APPLICATIONS

This application is a continuation application of U.S. application Ser. No. 13/460,489, filed Apr. 30, 2012, which is a continuation of U.S. application Ser. No. 12/114,831, filed May 5, 2008, now U.S. Pat. No. 8,181,124, issued May 15, 2012, which is a continuation of U.S. application Ser. No. 09/801,983, filed Mar. 7, 2001, now U.S. Pat. No. 7,370,289, issued May 6, 2008, each assigned to the assignee of the present application. The subject matter in the above identified commonly owned applications are incorporated herein by reference.

BACKGROUND OF THE INVENTION

1. Field of the Invention

The present invention relates to the field of providing notification from applications requiring user attention. The present invention also relates to the field of managing a plurality of outstanding attention requests with an Attention Manager.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various personal information management (PIM) applications such as an address book, a daily organizer, scheduling calendar, and electronic notepads, to name a few. Palmtop computers with PIM software have been known as Personal Digital Assistants (hereinafter referred to as "PDAs").

Previously, support for various types of alarms used to get a user's attention were simple and effective for PDAs with less capability. In those cases, the operating system for a PDA would require the application with a record entry requiring user attention to be responsible for the alarm and user experience. However, the alarm system was most effective when operating only with one application with alarm capabilities. This was needed because different applications with alarm capabilities would be unaware of another application's set of alarms.

Typically, this application would be a datebook or calendar application. The calendar application could be used to arrange daily meetings and events. The operating system, through an alarm manager, maintains a queue of times for alarms and associated applications to be sublaunched. Thereafter, the application, e.g., the calendar application, is entirely responsible for the alarm/user experience.

Multiple applications with independent alarm systems did not provide an adequate user experience. In a typical scenario, alarms that are invoked may be "snoozed" or suspended for a predetermined period of time to allow a user to interact with applications on the PDA. This is accomplished by hitting a "snooze" button. The user would later return to and follow up with the snoozed alarm at a more convenient time. In the best case, the snooze button is intended to snooze all outstanding alarms or snoozed alarms.

However, since each application was responsible for user interaction with alarms, snoozing an alarm in one application would only snooze all the outstanding alarms associated with that application. The user would have to tap the snooze button for each application's alarm dialog before being allowed to use the device.

Thus, operating systems only allow one application to invoke an alarm dialog at a time. Accordingly, this one-to-one relationship between an operating system and one application on with an alarm system would be inadequate with today's more sophisticated personal digital assistants that have many applications requiring a user's attention.

Another problem with previous alarm systems involve multiple alarms that have been set-off but not cleared. A typical user scenario is one where a user has left the PDA unattended for a period of time, such as when on vacation, and returns to an unknown stack of set-off alarms that must be tediously dismissed on an individual basis.

The scenario starts when the "next" alarm, the first alarm while the user is on vacation, goes off. The operating system through an alarm manager sends a pair of sublaunch codes to the registered or corresponding application associated with the record entry requiring attention. The first sublaunch is user-interface free. The application typically checks to see if the alarm is really still valid (e.g. the meeting has not been canceled). If the alarm is still valid, then the operating system sends the second sublaunch.

The second sublaunch provides for a user interface. Here, the application is allowed to put up a dialog informing the user of the alarm with some rudimentary user interface. For example, a typical calendar application responds to the second sublaunch by putting up an alarm dialog.

The alarm dialog opens a window on the screen, and creates a nested event loop to handle events for the dialog. This nested event loop ignores virtually all events that would cause the dialog to go away, e.g., hard key characters that would cause an application to launch are ignored by this event loop. The result is the dialog is fixed on the screen, and it can not be dismissed until one of the embedded buttons is tapped.

Also, the currently active application remains active 'behind' the alarm dialog. However, a user cannot see or interact with the application, because the alarm dialog takes up the full screen. Additionally, the user cannot interact with the active application because the dialog's nested event loop is processing all events. Thus, the active application is effectively suspended until the dialogs have been dismissed or snoozed.

When a second alarm goes off before the first has been dismissed, the operating system still sends the first sublaunch, but defers the second user interface sublaunch until after the sublaunch from the first alarm has been completed. For applications that put up dialogs, this typically means that only one dialog at a time will appear on the screen.

The operating system does not return to the event loop between sublaunches, so when the first application sublaunch finally returns, the second application's first sublaunch will happen immediately, with third and subsequent application first sublaunches happening if necessary in the same order the alarms went off.

Returning from vacation, the user is only aware of the dialog present on the screen and is unaware that a stack of dialogs may exist. The net result for the user is that each alarm dialog in turn must be dismissed before the device can be used. Additionally, the dialogs are presented with the oldest first. This means that all the older dialogs must be dismissed before the most current dialog can be examined.

Furthermore, the previous alarm system did not allow users to directly navigate to a record entry requiring attention. Navigation to record entries was unnecessary in a typical calendar application because the calendar hard button could be pressed once the alarm stack has been dismissed. Pressing the calendar hard button would navigate the user to the calendar display with the current date and time on-screen. Presumably, the most current or most urgent alarms are associated with the current data.

However, if an alarm is set a significant amount ahead of the event in the future, e.g., a 5-day warning on an un-timed birthday reminder, it may be hard to locate the birthday event once the dialogs have been dismissed. A user would have to investigate all the calendar entries up to and including the birthday entry. Even then, there is no guarantee that the user will recognize that birthday entry is associated with the alarm.

Furthermore, adding a "go to" button would be challenging with this simple application-owned dialog approach. The problem is that in order for a dialog to implement the function, it would have to back out of all pending attention requests. That means essentially throwing away any other information that is waiting to be presented to the user.

Similarly, since the dialogs are stacked into nested event loops, if two applications compete for attention, one wins out and starves the other until the user dismisses that dialog.

At this point, the second application takes over. A "go to" subroutine would be severely impacted. Instead of navigating to the application and showing the corresponding data, a subsequent dialog with some other attention request would appear.

SUMMARY OF THE INVENTION

Accordingly, embodiments of the present invention disclose a method and system of managing a plurality of outstanding attention requests with an Attention Manager.

Further, the Attention Manager manages competing application/driver demands for a user's attention automatically. Also, the Attention Manager provides for a centralized mechanism for a more efficient user interface when dealing with multiple attention requests.

Specifically, in one embodiment of the present invention, an Attention Manager manages application demand for a user's attention. The Attention Manager receives multiple attention requests from varying applications. With each new attention request received that indicates a record needs a user's attention, the Attention Manager stores the request in memory and determines if there are other outstanding attention that have not been cleared.

Depending on the number of outstanding requests, the Attention Manager sends a request for record information in list or detail format. After receiving the information, if there are multiple outstanding attention requests that have not been cleared and are not suspended or snoozed, the attention manger creates and displays a notification dialog in a list format. If there is only one outstanding attention request, or if all the outstanding attention requests are snoozed except for the new or first attention request, the Attention Manager creates and displays the notification dialog in detail format. In either case, the notification dialog is presented over an active application.

In another embodiment of the present invention, each of a plurality of outstanding attention requests that no longer need a user's attention have been deleted from memory or cleared by a user. In a list view, the user need only to tap on a check box to delete the outstanding attention request. In a detail view, the user need only tap on the "Done" button to delete the outstanding attention request. In either case, the corresponding record entry still remains fully stored in memory. Only the attention request has been deleted.

Furthermore, the Attention Manager allows all the outstanding attention requests to be cleared simultaneously. In a list view, if all the list entries no longer need further user on, without individually the request, all the outstanding attention can be simultaneously cleared.

Also, in another embodiment of the present invention, from a notification dialog, the Attention Manager helps navigate to a specific record entry for further review through the corresponding application. Upon receiving a request to display a selected record entry from a selected attention request, the Attention Manager automatically switches from the underlying active application to automatically launch the application associated with the selected record entry. The Attention Manager relays the display request to the newly launched application.

From there, the newly launched application automatically displays the said selected record entry. Further, a user is provided with user interface with said selected record entry through the newly launched application to view in more detail the record entry.

Another embodiment of the present invention discloses an Attention Manager that allows snoozing of all outstanding attention requests for all the applications located within a personal digital assistant. A request to suspend a plurality of attention requests applies to all the requests globally. The suspension lasts for a predetermined period of time, upon which the Attention Manager again displays the plurality of attention requests. In the meantime, the user is free to use the PDA and interact with any application without interruption from all the suspended or snoozed attention requests.

Additionally, in another embodiment of the present invention, an indicator is displayed simultaneously with an active application without interrupting the active application.

The indicator is small enough to fit in the title bar of the active application in one embodiment.

The indicator informs the user that at least one of a plurality of outstanding attention requests have not been cleared. In one embodiment the indicator shows that outstanding requests that have been snoozed are pending. In another embodiment, the indicator shows that subtle attention for un-timed events exist and are pending.

Further, in an embodiment of the present invention, the Attention Manager can override a snoozing operation to display a plurality of outstanding attention requests that have been snoozed. In one embodiment, a user can tap on the indicator to access and display the notification dialog in list form.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 3 is an exploded view of the components of the palmtop computer system of FIG. 2A.

FIG. 9 a flow diagram illustrating steps in a computer implemented method for displaying a notification dialog, in accordance with one embodiment of the present invention.

FIG. 10 is a flow diagram illustrating steps in a computer implemented method for selecting an attention request in order to access and view the selected record entry associated with a selected attention request, in accordance with one embodiment of the present invention.

DETAILED DESCRIPTION OF THE INVENTION

Figure 1A:
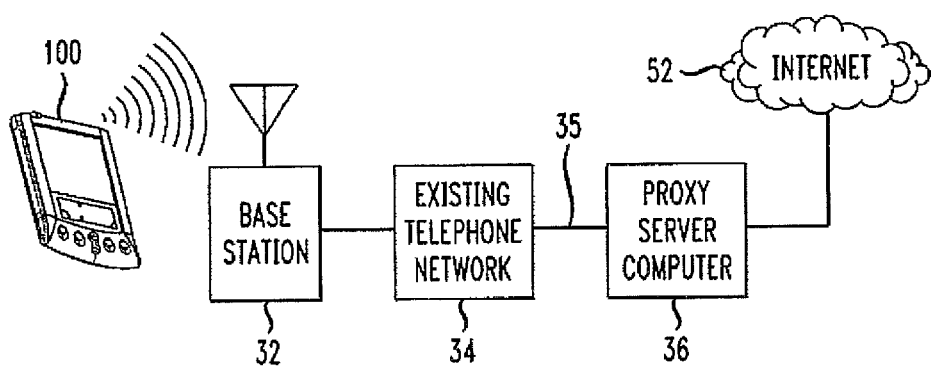
FIG. 1A illustrates a block diagram of a first exemplary network environment including a personal digital assistant in accordance with an embodiment of the present invention.

Reference will now made in detail to the preferred embodiments of the present invention, an Attention Manager for providing notification that an application requires a user's attention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any electronic device having applications with alarm or notification systems associated with specific record entries requiring a user's attention. One of the common types of electronic systems which can be used in accordance with one embodiment of the present invention is referred to as a personal digital assistant, or commonly called a PDA. The PDA is a pocket sized electronic organizer with the capability to store telephone numbers, addresses, daily appointment, and software that keeps track of business or personal data such as expenses, etc.

Furthermore, the PDA also has the ability to connect to a computer, enabling the two to exchange updated information, that is synchronize the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface). In particular, the PDA can be used to browse Web pages located on the Internet.

The PDA can be coupled to a networking environment. It should be appreciated that embodiments the present invention are well suited to operate within a wide variety of electronic systems (e.g., computer systems) which can be communicatively coupled to networking environment, including cellular phones, pagers, etc.

FIG. 1A is a block diagram of an exemplary network environment 50 including an exemplary personal digital assistant. The PDA 100 is also known as a palmtop or palm-sized electronic system or computer system. The PDA 100 has the ability to transmit and receive data and information over a wireless a communication interface (e.g., a radio interface). The PDA 100 is one exemplary implementation on which the present invention can operate. The present invention can operate on any portable electronic system or device.

In one embodiment, base station 32 is both a transmitter and receiver base station which can be implemented by coupling it into an existing public telephone network 34. Implemented in this manner, base station 32 enables the personal digital assistant 100 to communicate with a proxy server computer 36, which is coupled by wire 35 to the existing public telephone network 34. Furthermore, proxy server computer system 36 is coupled to the Internet 52, thereby enabling the PDA 100 to communicate with the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and information between the PDA 100 and base station 32. It should be appreciated that one embodiment of a wireless communication system in accordance with the present invention is the Mobitex wireless communication system.

Figure 1B:
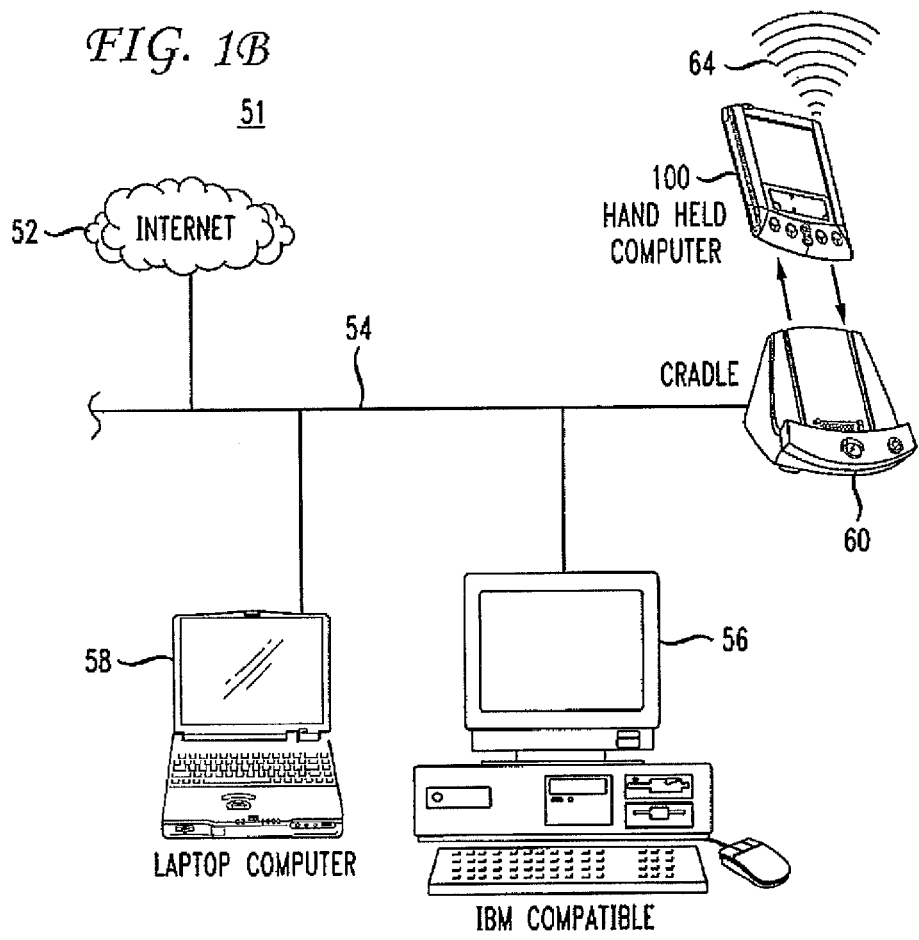
FIG. 1B illustrates a block diagram of a second exemplary network environment including a personal digital assistant coupled to other computer systems and the Internet via a cradle device in accordance with an embodiment of the present invention.

FIG. 1B illustrates a system 51 that can be used in conjunction with the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a personal digital assistant 100 in one embodiment of the present invention. Cradle 60 provides an electrical and mechanical communication interface between bus 54 (and anything coupled to bus 54) and the computer system 100 for two way communications. Computer system 100 also contains a wireless infrared communication mechanism (e.g., an infrared emitter and detector device) for sending and receiving information from other similarly equipped devices, as shown in signal 64 (see FIG. 1B).

With reference to FIGS. 1A and 1B, it is appreciated that the exemplary personal digital assistant or palmtop computer system 100 can be used in network environment combining elements of networks 50 and 51. That is, as will be seen below, the PDA 100 can include both a wireless infrared communication mechanism and a signal (e.g., radio) receiver/transmitter device.

Figure 2A:
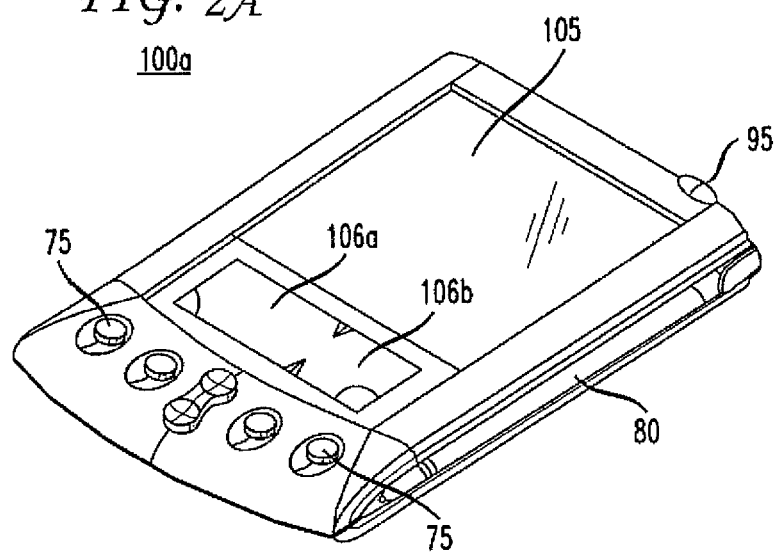
FIG. 2A is a top side perspective view of a palmtop computer system that can be used as a platform for the data entry and authentication embodiments of the present invention.

FIG. 2A is a perspective illustration of the top face 100a of one embodiment of the palmtop computer system. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is so shown.

FIG. 2A also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a or 106b. The stroke information is then fed to an internal processor for automatic character recognition. Once characters are recognized, they are typically displayed on the screen for verification and/or modification.

Figure 2B:
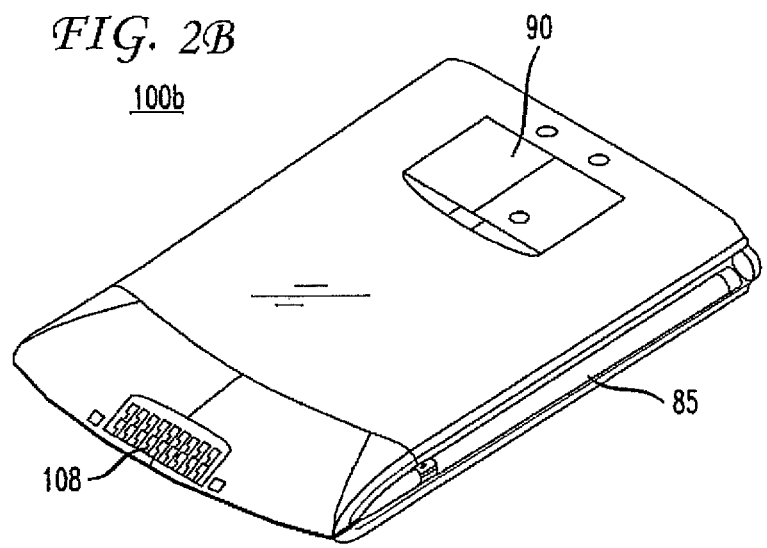
FIG. 2B is a bottom side view the palmtop computer system FIG. 2A.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, USB, SCSI, Firewire (IEEE 1394), Ethernet, etc. It is appreciated that interface 108 can also be used for charging current when using rechargeable batteries.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. A digitizer pad can be part of the display assembly or it can also be included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
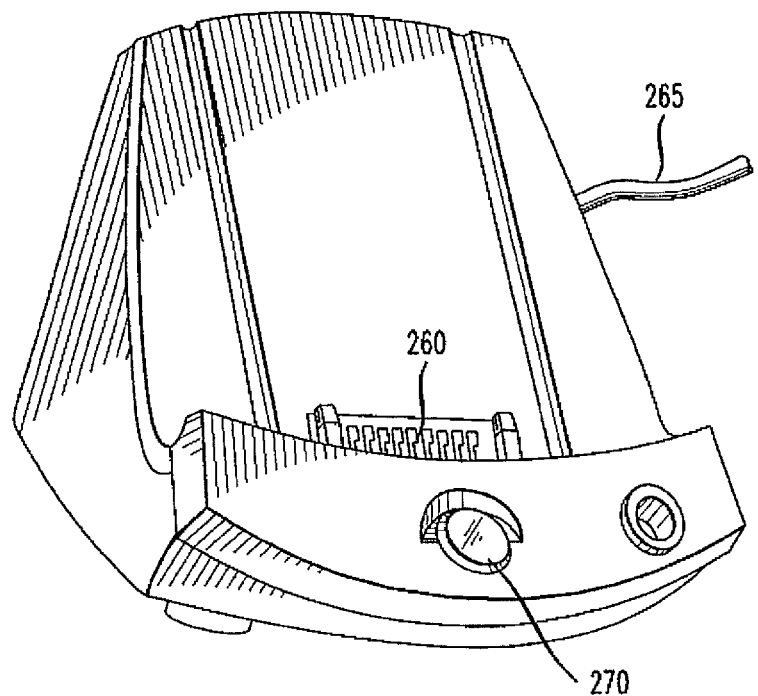
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with communication interface 108 (FIG. 2B) of computer system 100 when system 100 is slid into the cradle 60 in an upright position. Once inserted, button 270 can be pressed to initiate two way communication between system 100 and other computer systems coupled to electrical interface cable 265.

Figure 5:
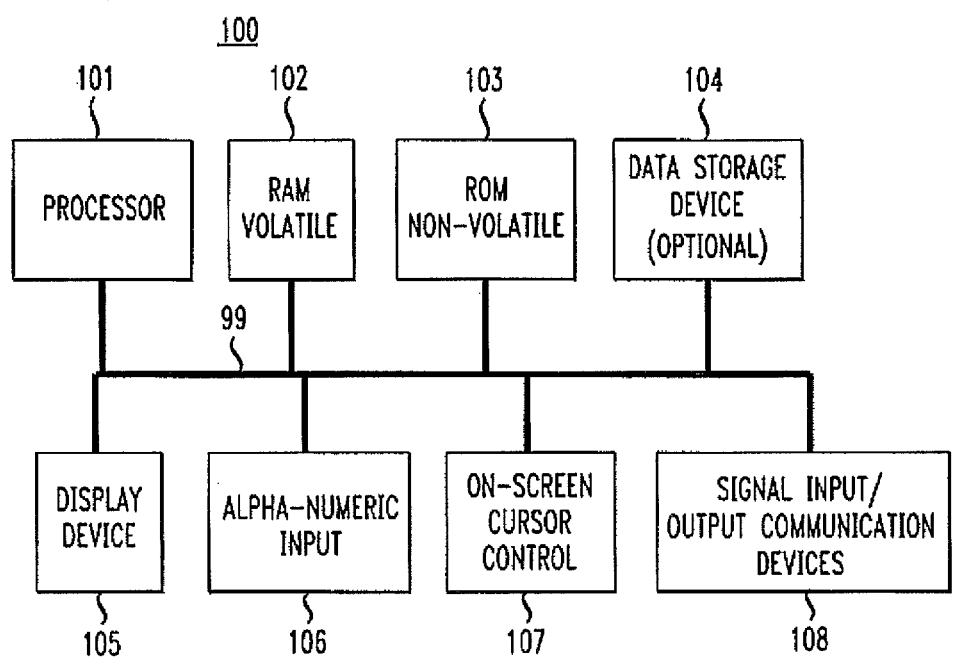
FIG. 5 is a logical block diagram the palmtop computer system in accordance with an embodiment of the present invention.

Referring now to FIG. 5, portions of the present electronic system are comprised of computer-readable and computer-executable instructions which reside, for example, in computer-readable media of an electronic system (e.g., personal digital assistant, computer system, and the like). FIG. 5 is a block diagram of exemplary interior components of an exemplary personal digital assistant 100 upon which embodiments of the present invention may be implemented. It is appreciated that the exemplary PDA 100 of FIG. 5 is only exemplary and that the present invention can operate within a number of different electronic systems including general purpose networked computer systems, embedded computer systems, and stand alone electronic systems such as a cellular telephone or a pager.

FIG. 5 illustrates circuitry of an exemplary system or system 100 (such as the personal digital assistant), some of which can be implemented on PC board 225 (FIG. 3). Exemplary computer system 100 includes an address/data bus 99 for communicating information, a central processor 101 coupled with the bus 99 for processing information and instructions, a volatile memory 102 (e.g., random access memory (RAM), static RAM dynamic RAM, etc.) coupled with the bus 99 for storing information and instructions for the central processor 101 and a non-volatile memory 103 (e.g., read only memory (ROM), programmable ROM, flash memory, EPROM, EEPROM, etc.) coupled to the bus 99 for storing static information and instructions for the processor 101. Exemplary computer system 100 also includes an optional data storage device 104 (e.g., memory card, hard drive, etc.) coupled with the bus 99 for storing information and instructions. Data storage device 104 can be removable. As described above, exemplary computer system 100 also contains an electronic display device 105 coupled to the bus 99 for displaying information to the computer user. In one embodiment, PC board 225 (FIG. 3) can contain the processor 101, the bus 99, the ROM 103 and the RAM 102.

Also included in computer system 100 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 100 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

With reference still to FIG. 5, exemplary computer system 100 also includes a signal input/output device 108 which is coupled to bus 99 for providing a communication link between computer system 100 and a network environment (e.g., network environment 50 and 51 of FIGS. 1A and 1B respectively). As such signal input/output device 108 enables central processor unit 101 to communicate wirelessly with other electronic systems coupled to the network. It should be appreciated that within the present embodiment, signal input/output device 108 is coupled to antenna 85 and provides the functionality to transmit and receive information over a wireless communication interface. It should be further appreciated that the present embodiment of signal input/output device 108 is well-suited to be implemented in a wide variety of ways. For example, signal input/output device 108 could be implemented as a modem. Further, signal input/output communication device 108, also coupled to bus 99, can be a serial port for communicating with the cradle 60. Additionally, device 108 can also include an infrared communication port.

Attention Manager

Although the description of the present invention will focus on an exemplary personal digital assistant (hereinafter referred to as "PDA") or palmtop computer system, the present can be practiced with other electronic systems or electronic devices (e.g. personal computer systems, cellular phones, pagers, portable web devices, etc.).

A PDA 100 device may be in one of three states when a user's attention is required: in use, nearby, or unattended. The Attention Manager is able to address each of these situations in managing attention requests.

If the PDA 100 is in use, the user pays attention immediately. The user will read about what needs their attention, and either dismiss it, snooze it, or go to the application.

If the device is nearby, the user hears the noise, feels the vibration, or sees the blinking light and may look at the device to immediately address the attention request. However, the user may also just put the device back down without addressing the attention request. In this case, in one embodiment, the Attention Manager will "nag" the user by replaying sound, vibrating in, etc. The nagging continues at application-specified intervals until either it gets the user's attention or it has nagged enough times, after which the nagging will cease.

If the device is unattended, then the attention requests will begin to accumulate and stack up since attention requests will go unnoticed, and nagging always fails. Such is the case when a user is on vacation.

When an application or event needs attention, the desired user experience is for something immediately apparent to happen: a dialog appears, a sound plays, an LED blinks, the device vibrates, etc. In one embodiment of the present invention, the Attention Manager provides an interface to these behaviors, so that a consistent look and feel is maintained across all applications.

In addition to getting the user's attention via some kind of special effect, the Attention Manager provides a mechanism the user to understand what application or event needs their attention. For example, a dialog with some text which might include the first few characters of an urgent message, or the description and time of a meeting, may be presented to the user. In another embodiment of the present invention, to make it easy for the user to get more details about what needs their attention, the Attention Manager provides a simple user interface to navigate to the application, and to the data within the application.

Further, when more than one event or more than one application requires the user's attention, in another embodiment, the Attention Manager provides a quick summary to quickly see everything which currently requires attention, to follow-up on items which are urgent, and acknowledge and dismiss items which are not.

In one embodiment, the Attention Manager is located within a layer of the operating system on the PDA 100. The Attention Manager layer deals with user between applications and alarms associated with record entries in the alarms. By centralizing the management of getting a user's attention, the Attention Manager reduces the amount of code to write, resolves conflicts between different applications that are competing with each other for the user's attention, and provides a platform such that hardware for special effects for getting a user's attention can be easily added.

Additionally, in another embodiment of the present invention, the Attention Manager includes support for hardware that can receive data without explicit user requests. This includes receiving data (e.g., SMS messages or e-mail) when not attached to a desktop or laptop computer, receiving data (e.g., pages) when the PDA 100 is powered off, or even receiving data (e.g., Bluetooth broadcasts) when the user is doing something else with the device.

Additionally, the Attention Manager can support new hardware devices which have dedicated communication services (radios), and can receive messages at any time. These devices may come coupled with user hardware dedicated to getting the user's attention, e.g., LEDs and buttons.

The Attention Manager is only designed for attempts to get attention that can be effectively suspended. It is not suitable for anything that requires an immediate response. For example, the Attention Manager does not attempt to handle a "put away" dialog that is used during beaming, or requests to connect to another user, or for a user to answer a telephone call, etc.

The Attention Manager is not intended to replace a ToDo application, or act as a universal inbox. Attention requests in an Application Manager are just reminders. Dismissing the attention request does not delete the item or record entry requiring attention. For example, clearing an attention request reminding a user of an appointment does not delete the record entry detailing the appointment in the calendar application.

Subtle and Insistent Attention Requests

There are two types of attention requests defining the urgency of the attention request: "insistent" and "subtle". The insistent version addresses more urgent requests for attention, such as appointments. An insistent attention request typically opens with some sort of dialog whenever possible. Further, and depending on user and/or application preference, the insistent attention request plays a sound, flashes an LED, vibrates, etc.

On the other hand, the subtle attention request provides a visual and optionally audible indication that something has happened, but otherwise does not disrupt the user's work flow. Subtle alarms tell the user that something has happened but does not disrupt the user from using the PDA 100. These passive or "subtle" attention attempts would be used for telling the user they have new e-mail, or perhaps that a holiday or birthday is coming up.

Figure 6:
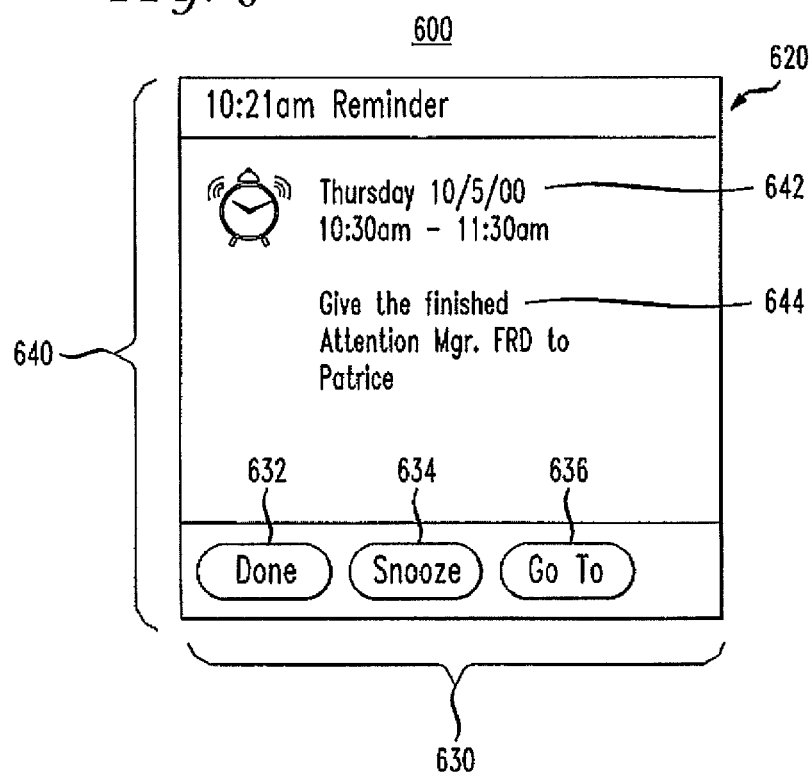
FIG. 6 illustrates a notification dialog in detail format, in accordance with one embodiment of the present invention.

When an application makes an insistent attempt to get the user's attention, a dialog much like the attention request dialog or notification dialog in FIG. 6 opens. FIG. 6 illustrates an exemplary dialog 600 in detail form found in a calendar application. Dialog 600 contains only one attention request since there may be no other outstanding attention requests that have not been cleared, or there may only be one attention request to be addressed.

The dialog 600 in FIG. 6 is drawn as a joint effort between the Attention Manager and the attention-getting application, in accordance with one embodiment of the present invention. The shell the window, the title bar 620, and the buttons 630 are drawn by the Attention Manager.

The remaining area 640 in the center is drawn by the application itself. The text in area 640 shows the due date and time 642 for which a project is due. The text 644 may include the beginning text for the record entry associated with the attention request.

The Attention Manager supports only drawing of the record entry, in one embodiment of the present invention. The Attention Manager does not allow applications to include active user-interface elements within the area 640 drawn by the application. For example, in FIG. 6, scroll bars, custom buttons, or other widgets that may appear within the area 640 cannot be enabled.

Figure 7:
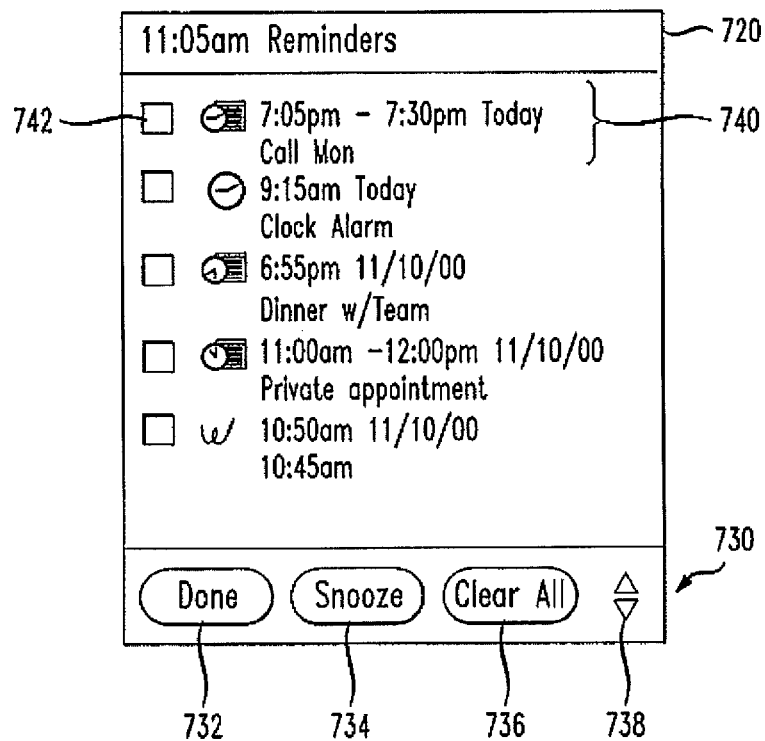
FIG. 7 illustrates a notification dialog in list format, in accordance with one embodiment of the present invention.

FIG. 7 illustrates an attention request or notification dialog 700 when there are multiple outstanding attention requests that have not been dismissed or snoozed, in accordance with one embodiment of the present invention. For example, the Attention Manager will present a dialog 700 in list form whenever an application attempts to get attention and previous attention requests have not been dismissed or snoozed.

Again, the dialog 700 in FIG. 7 is drawn as a joint effort between the Attention Manager and the attention-getting application, in accordance with one embodiment of the present invention. The shell of the window, the title bar 720, and the buttons 730 are drawn by the Attention Manager. In addition, the widgets or boxes, such as box 742, to the left each of the attention request line items are drawn by the Attention Manager.

In dialog 700, the Attention Manager manages the list of items including the "clear" widget in the left-hand column. Items are listed in order of occurrence, with the most recent attention request at the top.

In each of the line items, the remaining area to the right of the widget is drawn by the application itself. This gives the application some flexibility over what to display. For example, in line item 740, the calendar application draws the calendar icon and the line of text reminding the user to "Call Mom." The line items are drawn to a specific list format that is suitable for listing with a plurality of outstanding attention requests on a display screen of PDA 100.

FIG. 7 shows an exemplary list where the applications have space to draw their small icon and two lines of text in the standard font on the rightmost side the list area.

In each of the dialogs 600 and 700, user-interface is provided by the user-interface buttons 630 in dialog 600, and buttons 730 in dialog 700. The buttons 630 are wider and taller to facilitate finger tapping, in one embodiment. In FIG. 6, the Attention Manager facilitates a user to dismiss the attention request without removing the stylus from the holder.

Clear Attention Requests

The "OK" button 632 is pressed to clear the attention request. In dialog 700, the widget or box to the left of each of the line items is checked or marked to clear an individual line item attention request. For example, a user may have addressed the attention request, or may have found that the attention request is obsolete. In either case, the attention request is no longer needed. By pressing button 632 or the widget, such as widget 742, the attention request, as presented by dialog 600 and the appropriate line item in dialog 700, is deleted from memory. Clearing the attention request removes the attention item from the list or closes the dialog.

In accordance with another embodiment of the present invention, when removing an individual line-item in FIG. 7, the user taps on the clear widget in the left-hand column, here represented by a checkbox. The Attention Manager draws a line through each of the text lines.

However, although the attention request has been cleared, the associated record entry has not been deleted. Dismissing the attention request does not delete the item or record entry requiring attention. For example, clearing an attention request reminding a user of an appointment does not delete the record entry detailing the appointment in the calendar application.

Snooze or Suspend Attention Requests

The "Snooze" button 634 allows a user to suspend display of the dialog so that a user may use the PDA 100. The snooze buttons 634 and 734 dismiss temporarily the Attention Manager dialog. In addition, after a predetermined interval of time, if any attempts to get attention are still pending, the un-snooze will cause the dialog 600 or dialog 700 to re-open. Snooze does not remove attempts to get attention.

The Attention Manager supports an indicator, icon, or attention tab that is presented simultaneously with a current and active application on PDA 100. The indicator does not interrupt operation of the active application. FIG. 8b illustrates a launcher application 830 that is running on PDA 100. An indicator 835 is displayed simultaneously with the application 830 and indicates that there are outstanding attention requests that have not been cleared.

In one embodiment, indicator 835, a star, distinguishes attention requests that have been snoozed or suspended. When the list is not empty but there are no new then the "star" indicator will blink on and off until the list has been emptied.

Tapping on indicator 835 invokes the Attention Manager to display the attention list dialog. The dialog presents the outstanding attention requests in the Attention Manager.

Figure 8A:
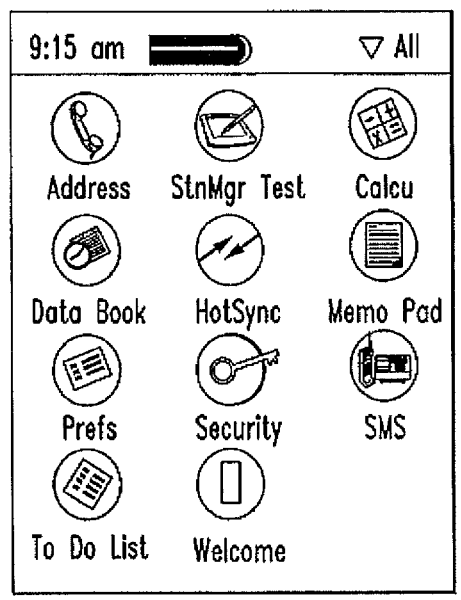
FIG. 8a illustrates an application without an indicator, in accordance with one embodiment of the present invention.
Figure 8B:
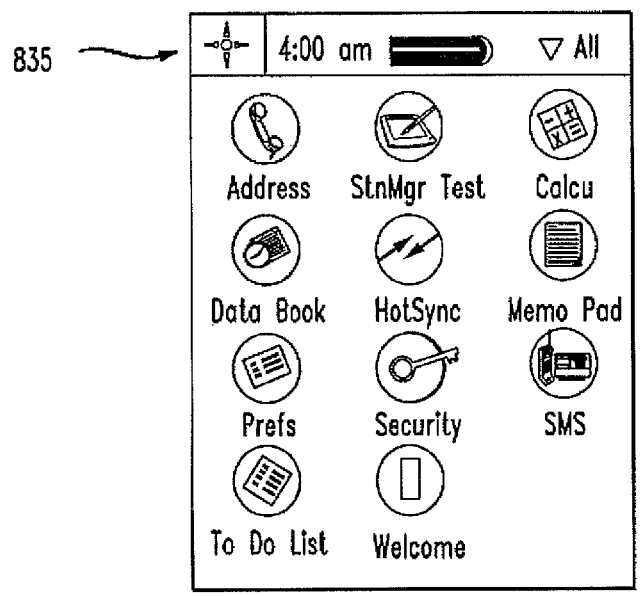
FIG. 8b illustrates an application with a previously seen attention indicator, in accordance with one embodiment of the present invention.

FIG. 8a illustrates a launcher application 810 for a PDA that currently does not have any outstanding attention requests. The menu application 810 is devoid of any attention indicators or attention tabs.

Returning to the snooze feature, when the snooze timer expires, the Attention Manager displays to the user exactly what was seen when the snooze button was hit, in accordance with one embodiment of the present invention. So if a user snoozed from a detailed view of an insistent alarm, the user should see the same alarm dialog. If they snoozed from the list view, they see the list view.

The Attention Manager allows for new attention alarms to be presented to a user even when previous attention requests are snoozed, in accordance with another embodiment of the present invention. For example, an insistent attention request appears in a detailed dialog. The user then taps the "Snooze" button, putting it to sleep for 5 minutes. Before the 5 minutes is up, a second insistent attention appears. In this case, the Attention Manager will display the second attention request in a dialog in detail form rather than in a list view showing both the first and second attention requests.

If the user taps "OK" to dismiss the second attention request, the snooze timer for the first request is not changed. A few minutes later, when the first snooze interval expires, the dialog for the first item (in detail) re-appears.

In another embodiment of the present invention, the Attention Manager has the capability to incorporate all the snoozed attention requests under a global snooze request. This possible since there just one "Snooze" timer in the Attention Manager, and the snooze operation applies to the Attention Manager as a whole.

For example, in the previous example, the user taps "Snooze" on the second insistent attention. This resets the snooze timer to five minutes and incorporates both the first and second attention requests under the snooze command. Five minutes later, both items will reappear in the list view.

From this list view, the user can tap "Snooze" again to reset the snooze timer on both attention requests, or the user can check off one or the other to clear, or they can simply hit the "DONE" button 732 which closes the window, but leaves the items pending in the list.

FIG. 9 illustrates a flow chart of steps in process 900 for displaying a notification dialog, in accordance with one embodiment of the present invention. In step 910, an attention request from an application is received at the Attention Manager. The attention request is associated with a corresponding record entry in the corresponding application. The record entry requires attention from a user.

In step 915, the Attention Manager automatically stores the attention request in memory. All the uncleared or outstanding attention requests are also stored in memory until they are cleared or deleted by the user.

In step 920, the Attention Manager determines if the new attention request is a subtle or insistent attention request. If the attention request is subtle, then process 900 continues to step 925 where the Attention Manager displays a subtle indicator in the title bar of the active application. The subtle indicator is small enough and programmed not to interfere with the active application. Process 900 then ends in step 927.

However, if in step 920 the attention request is an insistent attention request, then process 900 continues to step 930. In step 930, the Attention Manager determines if there are any uncleared or outstanding insistent attention requests besides the present attention request.

If not, then process 900 continues to step 955 where the Attention Manager automatically sends a command or request for detailed information about the record entry associated with the attention request.

The detailed information is received in step 960 of process 900. The Attention Manager then creates a notification dialog using the information received in step 960. Since the notification dialog only pertains to said first attention request, the amount of information available for the application to draw in the dialog is more than in a list format.

On the other hand, if in step 930, the Attention Manager determines that there are outstanding insistent attention requests, process 900 proceeds to step 935. In step 935, the Attention Manager determines if any of the outstanding attention requests are not snoozed or suspended, or in other words active, or still requiring a user's attention. Each of the outstanding attention requests are associated with corresponding applications and record entries. If all the outstanding insistent attention requests are currently snoozed, then process 900 proceeds to step 955.

However, if there are outstanding insistent attention requests that are not currently snoozed, then the Attention Manager sends a request or command to all the applications associated with the attention requests, at 940. A request is also sent to the application associated with the present attention request. The request is for information about each of the corresponding record entries associated with each of the attention requests. The information must be in a list format, since there are multiple attention requests that will be grouped together for presentation in a list dialog.

Each of the associated applications retrieves the corresponding list information for the record entries associated with outstanding attention request that are not snoozed. The list information is sent to and received by the Attention Manager in step 945.

In step 950, the Attention Manager arranges each of the received list information to compile a list dialog comprising each of the list entries for the outstanding attention requests. The list dialog is automatically displayed on top of any currently running application. An exemplary list dialog is presented in FIG. 7.

Then, from both steps 965 and 950, process 900 ends at step 970.

Goto an Attention Request

In still another embodiment of the present invention, the user can use the "Go To" button 636 in dialog 600 to launch the application and use the richer user interface provided by the application to access the record entry associated with the attention request in FIG. 6 in more detail.

Correspondingly, in dialog 700, a user can access a record entry associated with a line item by tapping on the icon or text of the line item. For example, to access the record entry associated with line item 740 in FIG. 7, a user need only to tap anywhere on the icon or text of the line item 740.

The GoTo function in the Attention Manager temporarily dismisses the Attention Manager user interface and launches the appropriate application to display details about the selected record entry. It is important to note that the application itself provides the user interface for accessing details about a selected record entry. For an SMS message, a detailed display of the message may be presented if there were only one message, or the application may present a list of all pending SMS messages when there are more than one.

For a "you've got mail" attention request, the e-mail application would probably present an inbox for all messages. For an alarm attached to a calendar application, the calendar application could take you to a view of the day containing the record with the current record entry associated with the selected attention request scrolled into view.

In another embodiment of the present invention, the "GoTo" function also removes the attention request from the Attention Manager. Aborted or failed "GoTo" attempts will not cause the item to disappear, because the application will not have successfully gone to the record entry associated with the selected attention request.

The "list" view in dialog 700 presents in summary form a list of the outstanding attention requests that have not been cleared. The attention requests may consist of several pages and can be accessed by the scroll buttons 738. In addition, Dialog 700 allows a user to summarily clear all the attention requests in dialog 700 by tapping on the "Clear All" button 736. This facilitates getting rid of multiple stale items after being away from the PDA 100 for a long period of time.

FIG. 10 illustrates a flow chart of steps in process 1000 for selecting an attention request in order to access and view the selected record entry associated with the selected attention request, in accordance with one embodiment of the present invention.

Process 1000 begins when an Attention Manager receives a request to display a selected record entry in step 1010. This request could be a GoTo request. The selected record entry is associated with a selected attention request that is taken from the plurality of outstanding attention requests. The attention request is selected from a notification dialog. In one embodiment, step 1010 could follow step 970 of process 900.

Continuing with process 1000, after step 1010, the Attention Manager switches the active application that is running under the notification dialog to the application that is associated with the selected attention request in step 1020 and automatically launches that application.

In step 1030, the Attention Manager the received the initial GoTo request to the application associated with the selected attention request. That associated application then processes the GoTo request and displays the selected record entry. Further, the associated application provides for user interface with the selected record entry.

In step 1040 of process 1000, the Attention Manager will display a subtle or insistent indicator if there remains any subtle or insistent outstanding attention requests.

Closing the List Dialog

FIG. 7 also provides a "Done" button 732 which simply closes the list view, in accordance with one embodiment of the present invention. The Attention Manager makes no changes to items in dialog 700, nor to any snooze timer. Also, the dialog 700 may contain insistent and/or subtle alarms.

For example, a first attention request is sent and displayed in dialog form with other outstanding attention requests. The user taps "Snooze", thus setting the timer. Before the 5 minutes is up, the user taps an attention tab, such as tab 835 in FIG. 8b, regards the list, and then taps "Done". After a few more minutes, when the original 5 minute timer expires, the list will re-open. Note that viewing the list did not change the snooze timer.

In another example, upon regarding the list in the previous example, the user taps the "Snooze" button instead of "Done". In this case, the snooze timer is reset, and five minutes after the tap the list re-opens.

Subtle Attention Requests

When a subtle attention request is made, the PDA 100 does whatever hardware cues are requested: beeping, buzzing, or blinking, but no dialog appears. Instead, a small on-screen indicator or attention tab in the title bar of the currently running application will appear. The attention tab can flash or animate to get the user's attention. Tapping on this indicator will bring up the Attention Manager user interface.

Figure 8C:
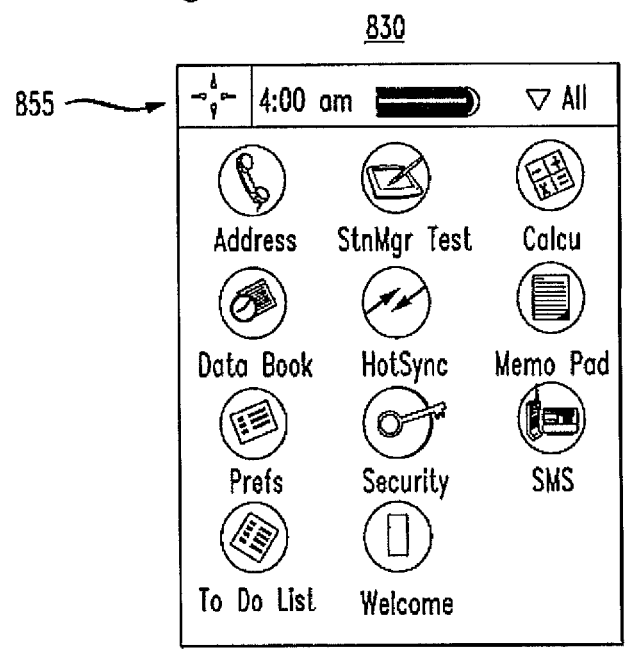
FIG. 8c illustrates an application with a new subtle attention indicator, in accordance with one embodiment of the present invention.

FIG. 8c shows a launcher application 850 on PDA 100 showing an indicator 855 on the title bar. The indicator 855, a bursting star, distinguishes a subtle attention request when a new subtle attention request is received. In one embodiment a repeating three part sequence indicates a new subtle attention request is present in the Attention Manager: 1) blank, 2) star, and 3) exploding star.

In another embodiment, on with hardware dedicated to the Attention Manager, e.g., a button combined with a flashing LED, the on-screen display can be supplemented. A user pressing the dedicated button will open the Attention Manager dialog.

Nagging

The Attention Manager supports a nagging feature for insistent and subtle attention requests. If the user does not respond by explicitly snoozing the outstanding attention requests or correspondingly dismissing them, the alarms continue to make noise at predefined intervals. The nagging continues for a predefined number of times, at which point the nagging stops.

The Attention Manager will provide the same nag options to all applications, via an application programming interface (API). The user can set these values in each of the application's sections, in one embodiment.

When there are multiple simultaneous attention items competing for nagging, the Application Manager defaults to the nag settings for the most recent insistent item, and if none then for the most recent subtle item.

Special Effects

When a new attention request is received, the Attention Manager will perform some combination of special effects, which can include playing sounds, flashing a LED, and buzzing a vibrator, in accordance with one embodiment of the present invention. The exact combination of effects is dependent on user settings, both globally (e.g., alarm volume) and in the application itself (e.g., which alarm to play.)

In another embodiment of the present invention, the Attention Manager sends a command to play an alarm to the application associated with an attention request requiring attention. In this case, the associated application and not the Attention Manager decides what type of alarm is invoked and the frequency with which it is played. These alarms may consist of varying alarms, some of which are listed as follows: audible alarms, visual alarms, vibrators, LEDs, flashing said notification dialog between video and reverse video formats, etc.

The Attention Manager makes every reasonable attempt to open the dialog before the special effects are performed, in one embodiment. Presenting the dialog first allows a user to know immediately what attention request is making noise, vibrating, etc. However, it is possible that the user interface with the dialog will be busy. For example, when PDA 100 is recalibrating its digitizer the Attention Manager cannot open the Attention Manager dialog immediately. The Attention Manager instead will we perform the special effects as soon as possible, before opening the dialog.

Also, the Attention Manager supports system-wide user preferences to control the set of special effects: what volume to play alarms at (or off) and whether or not to flash the LED (if any) or buzz the vibrator (if any), etc. Applications will be free to override these system-wide settings in either a positive way (always blink the LED, even if the user said not to) or a negative way (never blink the LED, even if the user desired it in general), in accordance with one embodiment of the present invention.

When multiple attention items compete for special effects, the most recent insistent attention request's special effect setting will be honored. If there is none, then the most recent subtle attention request's special effect setting will be honored.

Existing Non-Attention Manager Applications

Some third party applications put up their own model alarm-like dialogs. The Attention Manager always has priority over any third party alarm-like dialog.

In one case, the Attention Manager puts up an attention request dialog. Thereafter, a third party application puts up an alarm-like dialog "over the top" of the Attention Manager. The Attention Manager defers the user interface phase of the alarm manager sublaunch until after Attention Manager has been closed, in accordance with one embodiment of the present invention.

In another case, the third party alarm-like dialog first appears. Thereafter, the Attention Manager shows up "over the top" to display an attention request dialog. In this case, the third party dialog will exist "underneath" the Attention Manager, and will appear once the user has closed or snoozed the Attention Manager dialog.

Security and Attention Manager

When the PDA 100 is 'off and locked' it must be unlocked before any applications that use Attention Manager will not draw any details until the device unlocked.

When the device needs to auto-lock, the Attention Manager temporarily closes to allow the PDA 100 to launch the security application. The security application coordinates this function in accordance with one embodiment of the present invention. The security application will re-open the Attention Manager dialog after the security app is launched and the "enter password" dialog is displayed. This effectively puts the password dialog "under" the Attention Manager dialog.

When the user attempts to "Go To" any attention item, the attention window will close and the security window will appear from underneath. Once the user has entered their password, the "Go To" resumes and the application will launch. However, if the user does not enter the correct password, or taps on one of the other hard buttons to try to launch that application, the "Go To" is effectively aborted and the reminder will remain in the Attention Manager dialog.

In another embodiment of the present invention, Attention Manager can determine if outstanding attention requests have become stale or obsolete by deletion of the record entry through the synchronization process.

In still another embodiment of the present invention, the Attention Manager allows for updating and editing of outstanding attention requests. For example, a notification of new e-mail messages could be updated to reflect the number of new messages.

In another embodiment of the present invention, the Attention Manager allows clients or users to find out how many attention items are currently pending, if any.

In another embodiment of the present invention, the Attention Manager tells an application that a user has dismissed the item in the Attention Manager. The application may choose to clean or delete the corresponding record entry at that point.

Also, in another embodiment of the present invention, the Attention Manager provides a way for applications to tell the Attention Manager to forget about something. Typically this will be done after the application has handled a GoTo and the user has read about the item. For example, if there is a subtle attention pending that says "you have three e-mail messages waiting" and the user goes to the e-mail application to read the messages, the application can notify the Attention Manager to stop displaying the subtle attention icon.

While the methods of embodiments illustrated in process 800 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The instructions the steps, and the data input and output from the steps of process 900 and 1000 may be implemented shown in FIG. 5. Furthermore, other types of memory storage can be utilized to accomplish the aforementioned such as a hard drive, a CD ROM, flash memory, or any compact integrated circuit memory storage device.

The preferred embodiment of the present invention, a method and system for notification using an Attention Manager, is thus described. While the present invention has been described in particular embodiments, it should be appreciated that the present invention should not be construed as limited by such embodiments, but rather construed according to the below claims.

What is claimed is:

1. A method comprising:
receiving, by an attention manager operable by a portable computing device, a plurality of attention requests, each respective attention request of the plurality of attention requests being associated with a respective record entry from a plurality of record entries, wherein a first portion of the plurality of attention requests is received from a first application operable by the portable computing device, and wherein a second portion of the plurality of attention requests is received from a second application operable by the portable computing device;
responsive to determining that one or more attention requests have not been cleared and are not suspended:
receiving, by the attention manager, respective information for each respective record entry that is associated with a respective attention request from the one or more attention requests that have not been cleared and are not suspended; and
for each respective record entry associated with the respective attention request from the one or more attention requests that have not been cleared and are not suspended, outputting, for display as a respective list item of a notification list, at least a portion of the respective information; and
responsive to determining that all of the attention requests from the plurality of attention requests have been cleared or suspended:
receiving, by the attention manager, detail information for a record entry from the plurality of record entries that is associated with a particular attention request that requires attention from the user; and
outputting, for display, at least a portion of the detail information in a detail format.

2. The method of claim 1, further comprising:
storing, in a memory of the portable computing device, the plurality of attention requests, wherein each attention request of the plurality of attention requests is associated with a respective one of the list items of the notification list; and
responsive to receiving an indication of user input selecting one or more of the list items to remove from the notification list, deleting, from the memory of the portable computing device, each attention request of the plurality of attention requests associated with a respective selected list item of the one or more selected list items.

3. The method of claim 1, further comprising:
receiving, by the attention manager, an indication of user input selecting one or more of the list items of the notification list to suspend; and
suspending the selected one or more list items by at least suspending output of the selected one or more list items at the display.

4. The method of claim 3, further comprising:
determining, based at least in part on an association between each of the at least one attention requests and the suspended one or more list items, that at least one attention request of the plurality of attention requests is suspended; and
while the at least one attention request is suspended, refraining from outputting, for display, a portion of the information for the respective record entry from the plurality of record entries that is associated with each of the at least one suspended attention requests.

5. The method of claim 1, further comprising:
sending, by the attention manager and to the first application, a request for list information for each respective record entry from the plurality of record entries that is associated with the first portion of the plurality of attention requests; and
sending, by the attention manager and to the second application, a request for list information for each respective record entry from the plurality of record entries that is associated with the second portion of the plurality of attention requests;
receiving, by the attention manager and from the first application, the requested list information for each respective record entry from the plurality of record entries that is associated with the first portion of the plurality of attention requests as first list information;
receiving, by the attention manager and from the second application, the requested list information for each respective record entry from the plurality of record entries that is associated with the second portion of the plurality of attention requests as second list information; and
outputting, for display, the first list information and the second list information as the notification list.

6. The method of claim 1, wherein the portable computing device comprises a mobile phone.

7. The method of claim 1, wherein:
outputting, for display, at least a portion of the respective information comprises outputting, for display by a touchscreen display of the portable computing device, the at least the portion of the respective information, and
outputting, for display, at least a portion of the detail information in a detail format comprises outputting, for display by the touchscreen display, the at least the portion of the detail information in the detail format.

8. A portable computing device comprising:
a display;
at least one processor;
a memory configured to store a plurality of applications executable by the at least one processor, and to store a plurality of record entries; and
an attention manager operable by the at least one processor to: receive a plurality of attention requests, each respective attention request of the plurality of attention requests being associated with a respective record entry from the plurality of record entries, wherein a first portion of the plurality of attention requests is received from a first application operable by the portable computing device, and wherein a second portion of the plurality of attention requests is received from a second application operable by the portable computing device, responsive to determining that one or more attention requests have not been cleared and are not suspended, receive respective information for each respective record entry from the plurality of record entries that is associated with a respective attention request from the one or more attention requests that have not been cleared and are not suspended, and output, for display as a respective list item of a notification list, at least a portion of the respective information; and responsive to determining that all of the attention requests from the plurality of attention requests have been cleared or suspended, receive detail information for a record entry associated with a particular attention request that requires attention from the user, and output, for display, at least a portion of the detail information in a detail format.

9. The portable computing device of claim 8, wherein the attention manager is operable by the at least one processor to store, in the memory, the plurality of attention requests, wherein each attention request of the plurality of attention requests is associated with a respective one of the list items of the notification list, and, responsive to receiving the indication of the user input selecting the one or more of the list items to remove from the notification list, delete, from the memory, each attention request of the plurality of attention requests associated with a respective selected list item of the one or more selected list items.

10. The portable computing device of claim 8, wherein the attention manager is operable by the at least one processor to receive an indication of user input selecting one or more of the list items of the notification list to suspend, and to suspend the selected one or more list items by at least suspending output of the selected one or more list items at the display.

11. The portable computing device of claim 10, wherein the attention manager is operable by the at least one processor to determine that at least one attention request of the plurality of attention requests is suspended based at least in part on an association between each of the at least one attention requests and the suspended one or more list items, and, while the at least one attention request is suspended, to refrain from outputting, for display, a portion of the information for the respective record entry from the plurality of record entries that is associated with each of the at least one suspended attention requests.

12. The portable computing device of claim 8, wherein the attention manager is operable by the at least one processor to send, to the first application, a request for list information for each respective record entry from the plurality of record entries that is associated with the first portion of the plurality of attention requests, to send, to the second application, a request for list information for each respective record entry from the plurality of record entries that is associated with the second portion of the plurality of attention requests, to receive, from the first application, the requested list information for each respective from the plurality of record entries that is record entry associated with the first portion of the plurality of attention requests as first list information, to receive, from the second application, the requested list information for each respective record entry from the plurality of record entries that is associated with the second portion of the plurality of attention requests as second list information, and to output, for display, the first list information and the second list information as the notification list.

13. The portable computing device of claim 8, wherein the portable computing device comprises a mobile phone.

14. The portable computing device of claim 8, wherein the display comprises a touchscreen display.

15. A computer-readable storage medium encoded with instructions that, when executed, cause one or more processors of a portable computing device to:
  receive a plurality of attention requests, each respective attention request of the plurality of attention requests being associated with a respective record entry from the plurality of record entries, wherein a first portion of the plurality of attention requests is received from a first application operable by the portable computing device, and wherein a second portion of the plurality of attention requests is received from a second application operable by the portable computing device;
  responsive to determining that one or more attention requests have not been cleared and are not suspended:
    receive respective information for each respective record entry that is associated with a respective attention request from the one or more attention requests that have not been cleared and are not suspended; and
    for each respective record entry associated with the respective attention request from the one or more attention requests that have not been cleared and are not suspended, output, for display as a respective list item of a notification list, at least a portion of the respective information; and
  responsive to determining that all of the attention requests from the plurality of attention requests have been cleared or suspended:
    receive detail information for a record entry from the plurality of record entries that is associated with a particular attention request that requires attention from the user; and
    output, for display, at least a portion of the detail information in a detail format.

* * * * *